(12) United States Patent
Ferguson et al.

(10) Patent No.: US 8,875,358 B2
(45) Date of Patent: Nov. 4, 2014

(54) SNAP-HOOK

(75) Inventors: Thomas B. Ferguson, Kingston Springs, TN (US); Maureen Ferguson, legal representative, Kingston Springs, TN (US); Michael H. McDonald, Franklin, TN (US)

(73) Assignee: Michael H. McDonald, Franklin, TN (US)

( * ) Notice: Subject to any disclaimer, the term of this patent is extended or adjusted under 35 U.S.C. 154(b) by 68 days.

(21) Appl. No.: 13/434,653

(22) Filed: Mar. 29, 2012

(65) Prior Publication Data
US 2012/0279027 A1 Nov. 8, 2012

Related U.S. Application Data

(60) Provisional application No. 61/482,158, filed on May 3, 2011.

(51) Int. Cl.
*F16B 45/02* (2006.01)
(52) U.S. Cl.
CPC ...................................... *F16B 45/02* (2013.01)
USPC ......................................................... 24/599.6
(58) Field of Classification Search
CPC ............................... F16B 45/02; F16B 45/025
USPC ............. 24/599.6, 369, 265 H, 599.4, 599.7, 24/599.8, 599.1, 599.5; 292/82.17, 82.19, 292/82.2, 82.21
See application file for complete search history.

(56) References Cited

U.S. PATENT DOCUMENTS

| | | | | |
|---|---|---|---|---|
| 686,258 | A | * | 11/1901 | Buzard .......................... 278/114 |
| RE17,390 | E | * | 7/1929 | O'Bannon ................... 294/82.2 |
| 3,624,872 | A | * | 12/1971 | Balder .......................... 24/599.7 |
| 4,179,148 | A | | 12/1979 | Johnson |
| 5,538,303 | A | | 7/1996 | Dunham |
| 6,925,690 | B2 | * | 8/2005 | Sievers ........................ 24/599.1 |
| 7,093,330 | B2 | | 8/2006 | Ferguson et al. |
| 7,526,843 | B2 | | 5/2009 | Lin |

OTHER PUBLICATIONS

International Search Report and Written Opinion dated Jul. 11, 2012 for International Application No. PCT/US2012/036171, from International Searching Authority, pp. 1-14, Alexandria, United States.
International Preliminary Report on Patentability dated Nov. 14, 2013 for International Application No. PCT/US2012/036171, from International Bureau, pp. 1-7, Geneva, CH.

* cited by examiner

*Primary Examiner* — Jack W Lavinder
(74) *Attorney, Agent, or Firm* — Michael Zarrabian, Esq.; Sherman & Zarrabian LLP

(57) ABSTRACT

A hook forms a portion of an eye loop. A lever is pivotally movable relative to the hook. The lever forming a remaining portion of the eye loop. A thumb tab engages the lever and is positioned in an angled slot defined in a guide plate. The thumb tab is slidable in the angled slot, forming a release mechanism, such that the sliding movement of the thumb tab in the angled slot urges the lever to pivot relative to the hook to open said eye loop. The lever further includes an opening for receiving a protruding portion of the thumb tab, such that the lever can rotate to open the eye loop, essentially without sliding the thumb tab down in the slot of the hook.

32 Claims, 15 Drawing Sheets

SNAP-HOOK

CROSS-REFERENCES TO RELATED APPLICATIONS

This application claims priority from U.S. provisional patent application Ser. No. 61/482,158, filed May 3, 2011, incorporated herein by reference.

BACKGROUND

1. Field of the Invention

The embodiments relate to snap-hooks, and in particular, to the field of single hand operational snap-hooks.

2. Description of the Related Art

Snap-hooks are used for a variety of purposes. Typically a snap-hook includes a hook and a lever that opens/closes the hook. Bull snap-hooks employ a swivel tab that pulls forward to open the snap-hook. However, this requires the use of two hands; one to hold the snap-hook and another to pull the tab outward. The "two handed" operation presents problems to users such as in the equestrian industry. For example, to attach or disconnect this snap-hook to a horse halter (when the snap-hook is used on a lead rope), the user must first let go of the halter to free both hands (momentarily losing control of the horse) in order to open the snap-hook for either attachment or disconnection of the snap-hook to/from the halter.

SUMMARY

The present invention provides a snap-hook apparatus. In one embodiment, the present invention provides a hook, forming a portion of an eye loop. A lever is pivotally movable relative to the hook. The lever forming a remaining portion of said eye loop with respect to the hook. A thumb tab engages the lever and is positioned in an angled slot defined in a guide plate. The thumb tab is slidable in the angled slot relative to the guide plate, forming a release mechanism, such that the sliding movement of the thumb tab in the angled slot urges the lever to pivot relative to the hook to open said eye loop. The lever further includes an opening for receiving a protruding portion of the thumb tab, such that the lever can rotate to open said eye loop, essentially without sliding the thumb tab down in the slot of the hook. The thumb tab is located on the front side of the snap-hook for operating of the release mechanism with one hand.

Another embodiment of the invention comprises a snap-hook, comprising a hook section having an open segment forming a portion of an eye loop. A lever is pivotally movable relative to the open segment of the hook section. A biasing means is positioned between the hook section and the lever for biasing the lever against pivoting relative to the hook section. A thumb tab engages the lever, the thumb tab including an extension disposed in an angled slot defined in a guide plate, such that the extension is slidable in the angled slot relative to the guide plate. The thumb tab and the lever forming a release mechanism, such that applying force to the thumb tab that overcomes said biasing, effects the extension to slide in the angled slot, wherein the lever pivots relative to the hook section to open said eye loop. A back side of the snap-hook can be placed into the palm of a user's hand to hold the snap-hook. The thumb tab is located on the front side of the snap-hook providing one hand operation of the release mechanism.

Yet another embodiment of the invention comprises a snap-hook, comprising a hook, forming a portion of an eye loop. A lever is movable relative to the hook and is positioned in an angled slot defined in a guide plate. The lever forming a remaining portion of said eye loop with respect to the hook; the lever further including an opening for receiving a protruding portion of an ergonomic thumb tab, such that moving the thumb tab causes the lever to move relative to the hook to open said eye loop. The lever is moveable to open said eye loop independent from moving the thumb tab, without the thumb tab moving.

Still another embodiment of the invention comprises a snap-hook, comprising a hook section having an open segment forming a portion of an eye loop. A lever is pivotally movable relative to the open segment of the hook section to block and unblock the open segment. The lever forming a remaining portion of said eye loop with respect to the hook section. A biasing means is positioned between the hook section and the lever for biasing the lever against pivoting relative to the hook section. A tab engages the lever. The tab including an extension disposed in an angled slot defined in a guide plate, such that the tab extension is slidable in the angled slot relative to the guide plate. The tab and the lever forming a release mechanism, such that applying force to the tab that overcomes said biasing, effects the tab extension to slide in the angled slot at an acute angle. The lever pivots relative to the hook section to open said eye loop.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of a snap-hook apparatus and system, as well as operation and/or component parts thereof. While the following description will be described in terms of snap-hook systems and devices for clarity and to place the invention in context, it should be kept in mind that the teachings herein may have broad application to all types of systems, devices and applications.

One embodiment of the invention provides a hook, forming a portion of an eye loop. A lever is pivotally movable relative to the hook. The lever forms a remaining portion of the eye loop with respect to the hook. A thumb tab engages the lever and is positioned in an angled slot defined in a guide plate. The thumb tab is slidable in the angled slot relative to the guide plate, and forms a release mechanism. The sliding movement of the thumb tab in the angled slot urges the lever to pivot relative to the hook to open the eye loop. The lever includes an opening for receiving a protruding portion of the thumb tab. The lever can rotate to open the eye loop, essentially without sliding the thumb tab down in the slot of the hook. The thumb tab is located on the front side of the snap-hook for operating of the release mechanism with one hand.

Figure 1:
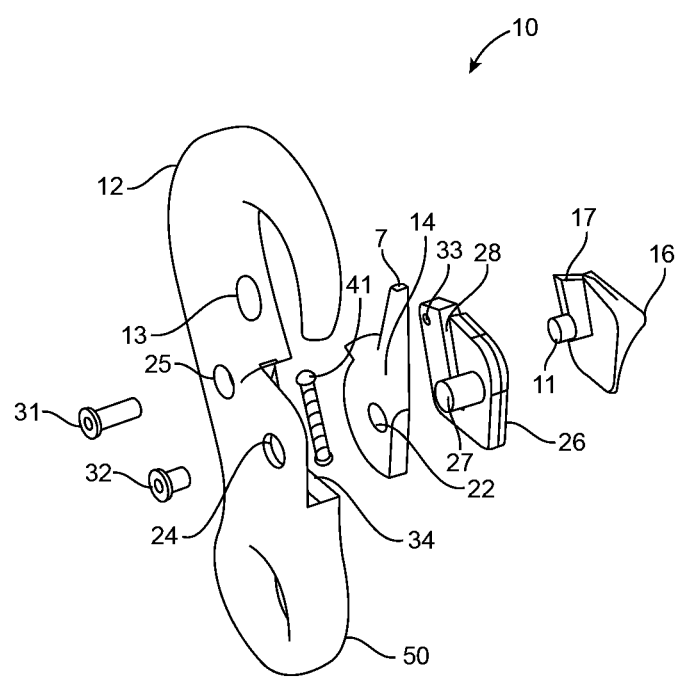
FIG. 1 illustrates an exploded right side perspective view of a snap-hook according to one embodiment of the invention.

FIG. 1 illustrates an exploded right side perspective view of a snap-hook 10 according to one embodiment of the invention. In one example, a snap-hook 10 provides "one handed" operation. In one embodiment, the snap-hook 10 comprises a hook 12 and a lever 14 that opens/closes hook 12. The snap-hook 10 includes a thumb actuated tab 16 for manually moving the lever 14. In one example, the lever 14 is spring-loaded to normally close the hook 12, wherein the lever 14 may be opened by asserting a force against the lever itself that is large enough to compress a biasing element 41. In this example, upon removal of the force, the biasing element 41 expands to urge the lever 14 to its original position to close the hook 12. It should be noted that the biasing element 41 may comprise a leaf spring, a coil spring, etc.

As shown in FIG. 1, the location of the thumb tab 16 is on one side of the snap-hook 10. It should be noted that while the thumb tab 16 is illustrated as coupled to the left side of the snap-hook 10, the thumb tab 16 may be placed on the right side of the snap-hook 10 in other embodiments. In one example the lower portion of the snap-hook 10 includes a lower ring or formed loop 50. In one example, the formed loop 50 may be used for coupling to other devices, for example, rope, chain, other snap-hooks, cord, wire, hanging devices, pulleys, etc. In one example, pin 31 couples with fitting 33 of a guide plate 26 via opening 25. In another example, pin 32 couples with a pin 27 via opening 24 of the snap-hook 10 and opening 22 of the lever 14. In one embodiment of the invention, pin 31 and pin 32 may each comprise a rivet, a screw, a hollowed fastening pin, etc.

Figure 2:
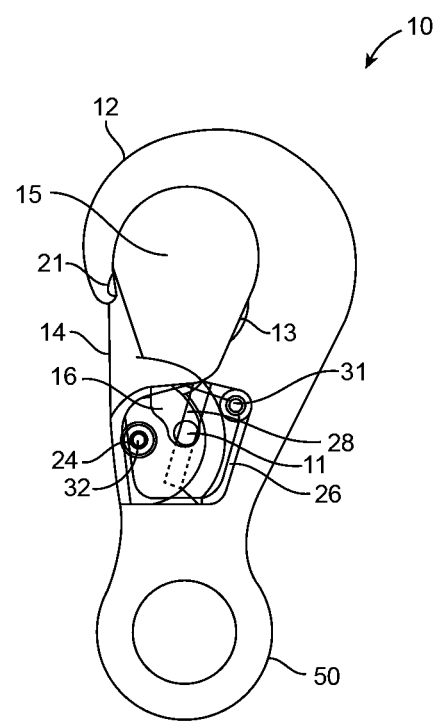
FIG. 2 illustrates a left side view showing an internal opening/closing mechanism according to one embodiment of the invention.

FIG. 2 illustrates a left side view of the snap-hook 10 showing an internal opening/closing mechanism according to one embodiment of the invention. As shown the hook 12 and lever 14 essentially form a loop 15 or an eye loop. Included in the snap-hook 10 is a groove or slot 13 that receives an end 7 (FIG. 1) of the lever 14 upon the snap-hook being placed in an open state. The slot 13 allows said end 7 of the lever 14 to become recessed into the hook 12 and provides a larger opening 15 within the snap-hook 10 than if the end 7 only pressed against the hook 12 without the slot 13.

Figure 3:
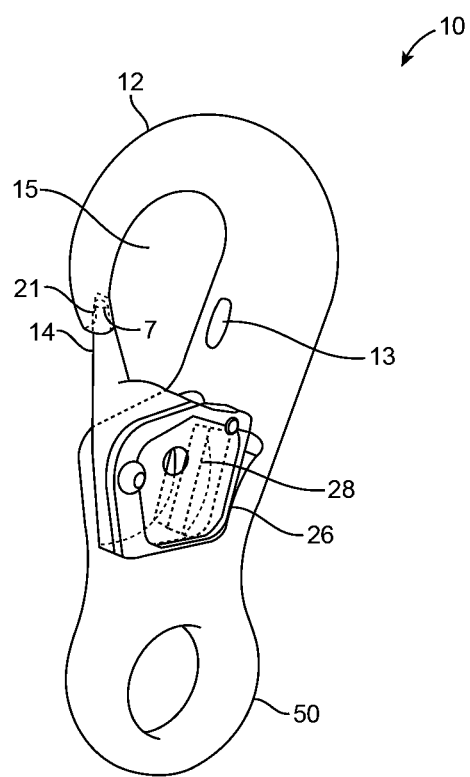
FIG. 3 illustrates a left side perspective view showing an internal opening/closing mechanism according to one embodiment of the invention with the lever in a closed position.

FIG. 3 illustrates a left side perspective view of the snap-hook 10 showing an internal opening/closing mechanism according to one embodiment of the invention with the lever in a closed position. In one example, the thumb actuated tab 16 (FIGS. 1-2) includes a guide pin or protruding portion 11 (FIGS. 1-2) and a guide or extension portion 17 (FIG. 1) that couples with an angled slot 28 of the guide plate 26. In one example, a pin 27 of the guide plate 26 couples with an opening 22 of the lever 14. The thumb tab 16, guide plate 26 and lever 14 are coupled to a receiving portion 34 of the snap-hook 10. The lever 14 is then secured with a fastening device, such as a screw, a rivet, weld, etc., through an opening 24 in the snap-hook 10. In one example, the receiving portion 34 comprises a recess in a portion of the snap-hook 10 between the hook 12 and the loop 50.

Figure 4:
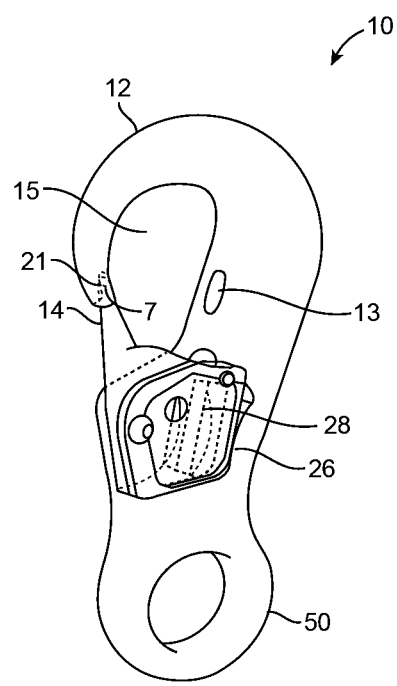
FIG. 4 illustrates another left side perspective view showing an internal opening/closing mechanism according to one embodiment of the invention with the lever in a closed position.

FIG. 4 illustrates another left side perspective view of the snap-hook 10 showing an internal opening/closing mechanism according to one embodiment of the invention with the lever in a closed position. In one example, the snap-hook 10 provides quick access to the thumb tab 16, and the ergonomic shape and location of the thumb tab 16 makes it easy for a user to depress/push down the thumb tab 16, which slides easily in the angled slot 28 to move the lever 14. The angled slot 28 provides for not only a quick and easy release/opening of the lever 14 of the snap-hook 10, but also essentially eliminates any torsion effect associated with operation of the snap-hook 10. This is because the movement of the extension 17 in the angled slot 28 causes the pressure needed to move the thumb tab 16 in a downward direction to be evenly distributed against the width of the thumb tab 16 of the snap-hook 10 as the snap-hook 10 is properly supported in the palm of a user.

Figure 5:
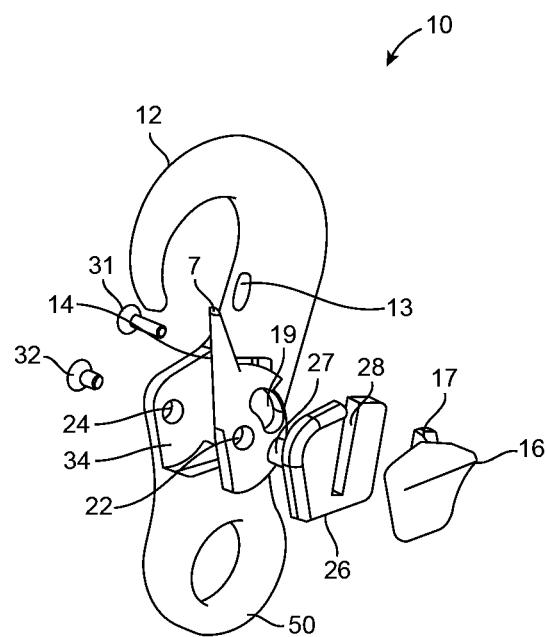
FIG. 5 illustrates an exploded left side perspective view of a snap-hook according to one embodiment of the invention.

FIG. 5 illustrates an exploded left side perspective view of a snap-hook 10 according to one embodiment of the invention. In one example, the thumb tab 16 need not be pushed down by a user to open or attach the snap-hook 10 to an object, such as a rope since the lever 14 may be forced to open the hook 12 by pressing the lever 14 directly against the object or vice versa.

Figure 6:
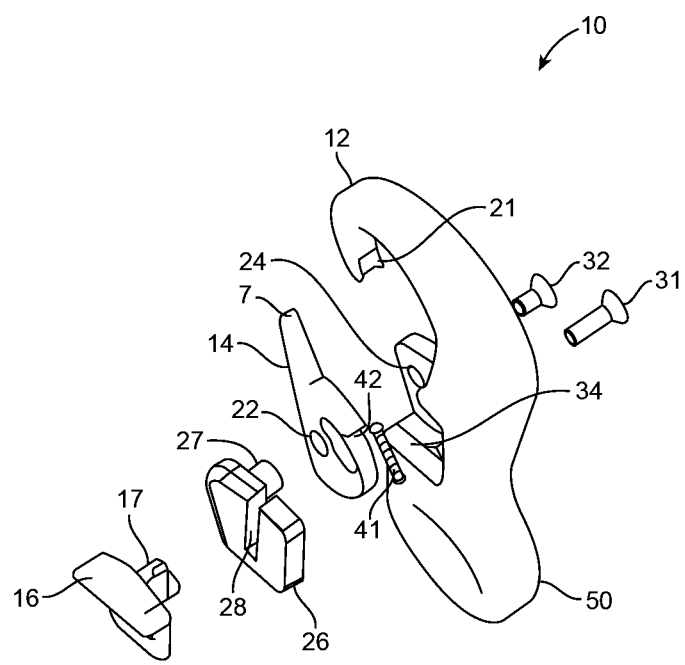
FIG. 6 illustrates another exploded left side perspective view of a snap-hook according to one embodiment of the invention.

FIG. 6 illustrates another exploded left side perspective view of a snap-hook 10 according to one embodiment of the invention. In one example, the hook 12 includes a groove or slot 21 for receiving an end 7 of the lever 14. Referring to FIGS. 5 and 6, the lever 14 includes a hole 22 proximate an end of the body thereof, and the hook 12 includes a corresponding hole 24, wherein the lever 14 is pivotally attached to the hook 12 by passing a pivot pin 27 of the guide plate 26 through said holes 22, 24.

Referring to FIGS. 5-6, a lower portion of the hook 12 has an essentially recessed section 34 that allows (accommodates) movement of a portion of the lever 14 into the recessed section 34 as the thumb tab 16 is pulled down along the slot 28. A biasing element 41, such as a spring, in the recessed section 34 of the hook 12 presses against a portion 42 of the lever 14 whereby the lever 14 is pivoted about the pivot pin 27 of the guide plate 26.

In one example, the portion 42 of the lever 14 is rotated in the recessed section 34 of the hook 12 in the open state (FIGS. 9-11) where the end 7 of lever 14 is moved away from the slot 21 towards the slot 13 by pivoting on pin 32 through hole 24 and hole 22 of the guide plate 26. In one embodiment of the invention, the drive pin 11 of the guide portion 17 interacts with the opening 19 for rotating the lever 14 in the recessed section 34 by force being applied to the lever 14 when the thumb tab 16 is pressed downward. When the thumb tab 16 is released, the biasing element 41 forces the lever 14 to rotate pin 27 through opening 22 and rotate the opening 19 over the drive pin 11. In one example, the opening 19 has a size that is larger than the drive pin 11. This allows the lever 14 to be forced open by applying pressure against the lever 14 towards the hook 12 to manually force open the hook 12 without moving the thumb tab 16. When this force is removed, the lever 14 rotates away from the hook with the opening 19 rotating over the drive pin 11. In one example, the opening 19 has an essentially oval shape. In other examples, the opening 19 may have polygonal shapes, such as triangular, rectangular, etc.

In one example, in the closed position shown in FIGS. 2-4, the biasing element 41 pushes up against the bottom of the lever 14 to pivot the lever 14 to an upright position such that the lever 14 blocks access to the hook aperture, forming the eye loop 15 with the hook 12.

Figure 7:
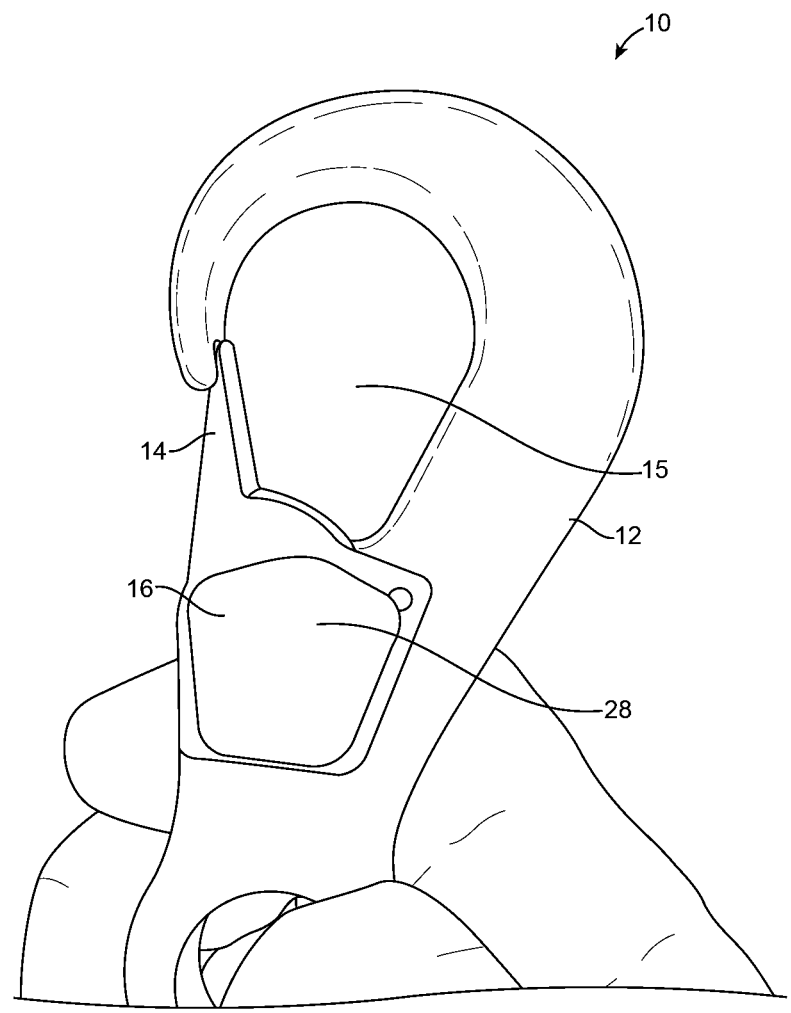
FIG. 7 shows a left side view of one embodiment of the invention with the lever in a closed position.

FIG. 7 shows a left side view of the snap-hook 10, in assembled form, according to one embodiment of the invention with the lever 14 shown in a closed position.

Figure 8:
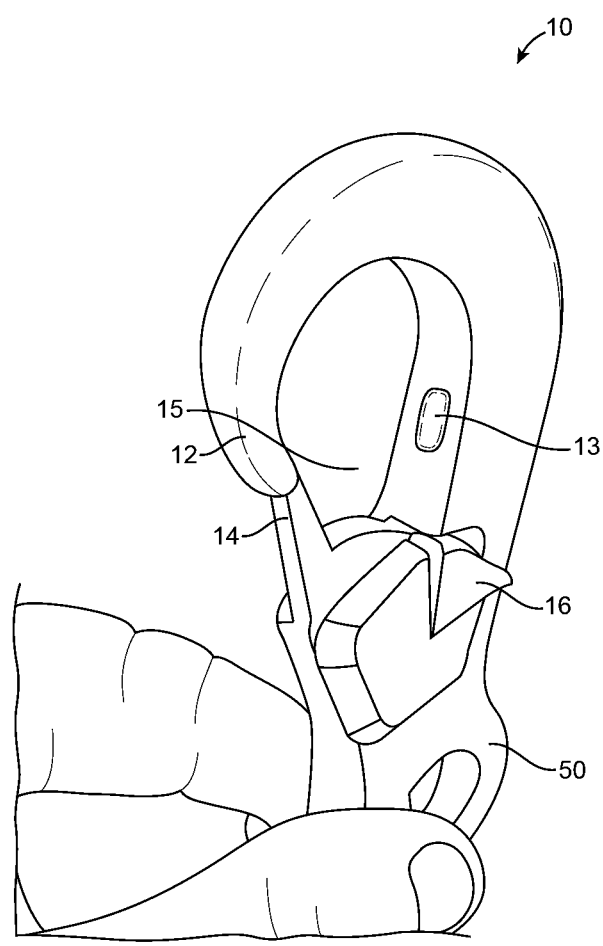
FIG. 8 shows a left perspective view of one embodiment of the invention with the lever in a closed position.

FIG. 8 shows a left perspective view of the snap-hook 10 according to one embodiment of the invention with the lever 14 shown in a closed position.

Figure 9:
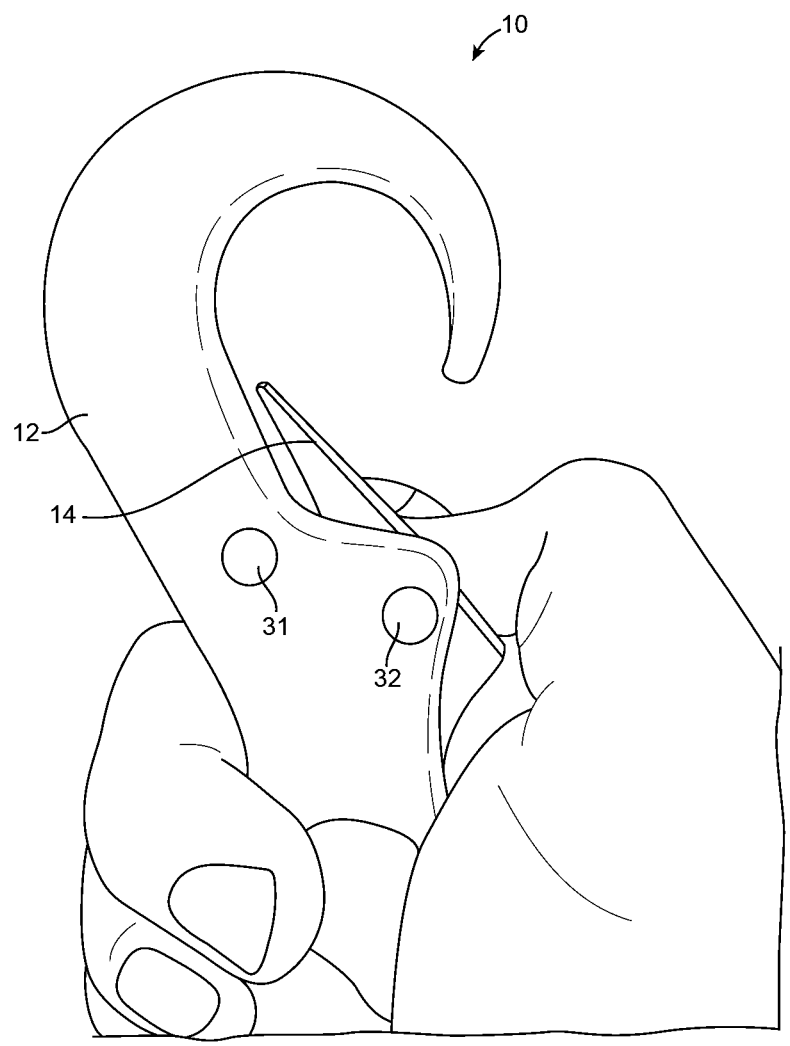
FIG. 9 shows a right side view of one embodiment of the invention with the lever held in an open position.
Figure 10:
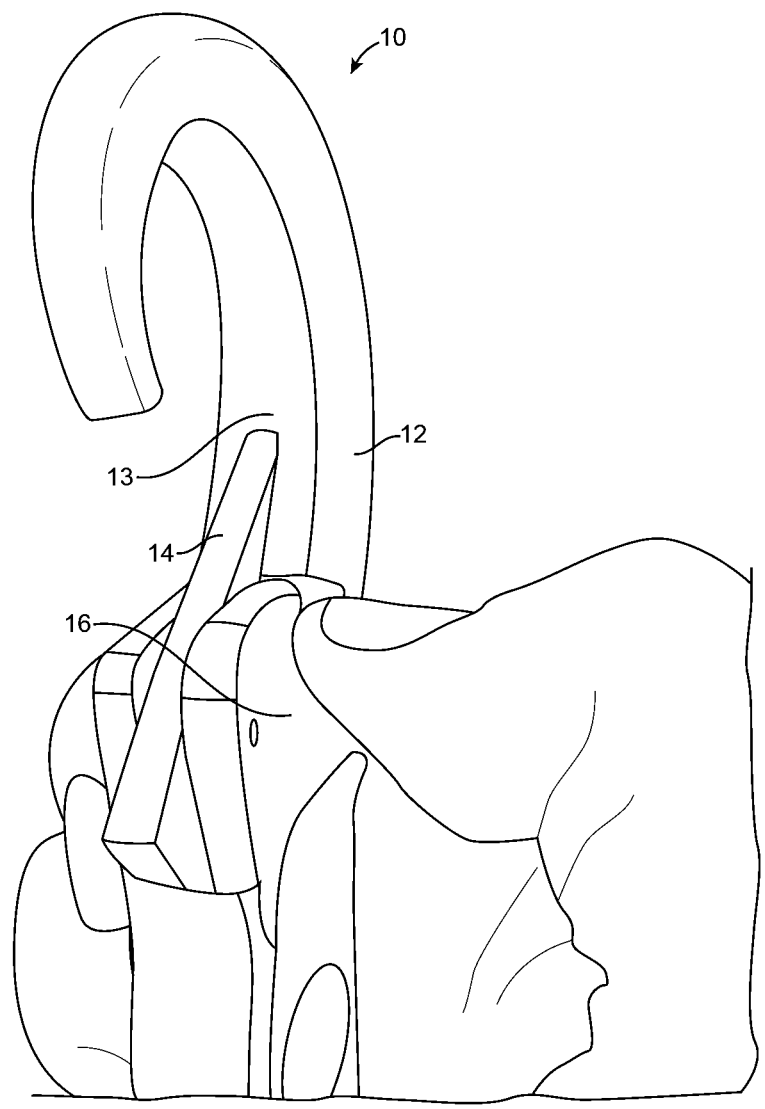
FIG. 10 shows a left perspective view of one embodiment of the invention with the lever in an open position.
Figure 11:
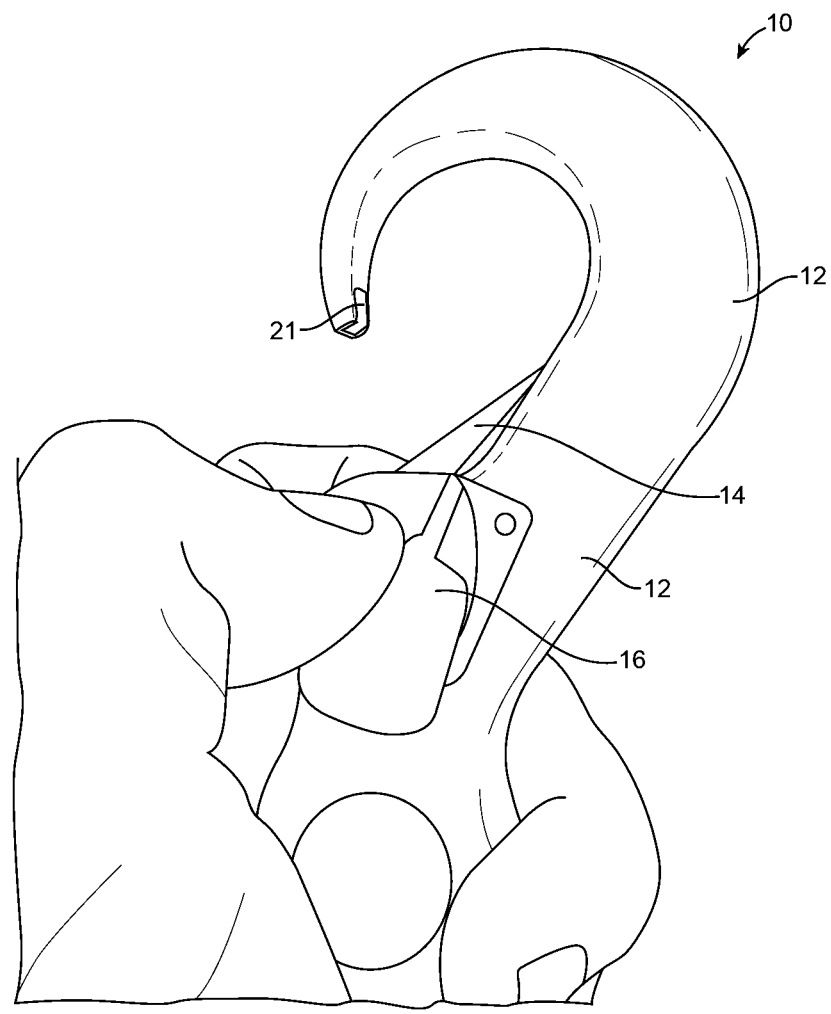
FIG. 11 shows a left side view of one embodiment of the invention with the lever held in an open position.

FIG. 9 shows a right side view of the snap-hook 10 according to one embodiment of the invention with the lever 14 held in an open position by pressing a user's thumb down on the thumb tab 16. FIG. 10 shows a left perspective view of the snap-hook 10 according to one embodiment of the invention with the lever 14 shown in an open position and engaged in the slot 13. In FIGS. 9-11, as the user presses their thumb down on the thumb tab 16, the guide portion 17 (FIG. 1) of the thumb tab 16 (FIG. 1) slides downward within the angled slot 28 (FIG. 1) and the drive pin 11 (FIG. 1) interacts with the opening 19 (FIG. 5) for rotating the lever 14 in the recessed section 34 (FIG. 1) towards the slot 13 via the pin 27 (FIG. 1), which rotates within opening 22 (FIG. 1).

FIG. 11 shows a left side view of the snap-hook 10 according to one embodiment of the invention with the lever 14 being held in an open position by pressing the thumb tab 16 downward with a user's thumb to slide the guide portion 17 down the slot 28 as the lever 14 is pivoted clockwise into the recessed section 34 of the hook 12 against the biasing element 41 (e.g., spring) resistance. In one example, as the lever 14 pivots into the open position in an essentially slanted angle, it unblocks hook opening.

In one example, once the thumb tab 16 is released, the biasing element forces the lever 14 back from the slanted position into the upright position, counter clockwise, to block the aperture of the hook 12 forming the loop 15.

The position of the thumb tab 16 on the side of the snap-hook 10 (facing the user as the snap-hook lays flat in the palm of a user's hand) allows quick access to the thumb tab 16. Further, the location of the thumb tab 16 makes it much easier to depress/push down the tab 16 to move the lever 14 into the open (slanted) position. This allows for not only a quick and easy release/opening of the snap-hook 10 with one hand only, but also essentially eliminates any swiveling or torsion effects associated with the snap-hook 10. This is because, according to embodiments of the invention, the pressure to depress the thumb tab 16 is evenly distributed against the width of the snap-hook 10 as it is properly supported in the palm of the hand, facing the user.

As shown in FIGS. 1-11, the snap-hook 10 may have essentially broad, opposing, front and back sides, and relatively narrower edges, such that the back side of the snap-hook 10 can be placed into the palm of a user's hand to hold the snap-hook 10, as shown in FIGS. 7-11. The thumb tab 16 is located on the front side of the snap-hook 10 to allow simpler holding of the snap-hook 10 and operation of the release mechanism with one hand while essentially eliminating swiveling of the snap-hook 10 in the hand.

In one example, the snap-hook 10 may have a thickness ranging between 0.3 inches to 0.5 inches, and may have a diameter range between 0.75 inches to 1.0 inches, preferably 0.78 inches. In one example, the loop 15 may have a diameter range between 1 inch to 1.25 inches, preferably 1.089 inches, and the height of the snap-hook 10 may have a range between 4 inches to 5 inches, preferably 4.4 inches. In one example, the radius of the hook 12 may have a range between 1 inches to 1.25 inches, preferably 1.031 inches. In one embodiment the distance between the front portion of the hook 12 to the back portion of the hook 12 may have a range between 1.9 inches to 2.25 inches, preferably 1.99 inches. In other embodiments of the invention, other variations of length, width, height, and thickness for the snap-hook 10 and its elements may have other ranges depending on the desired use of the snap-hook 10 and desired requirements.

Figure 12:
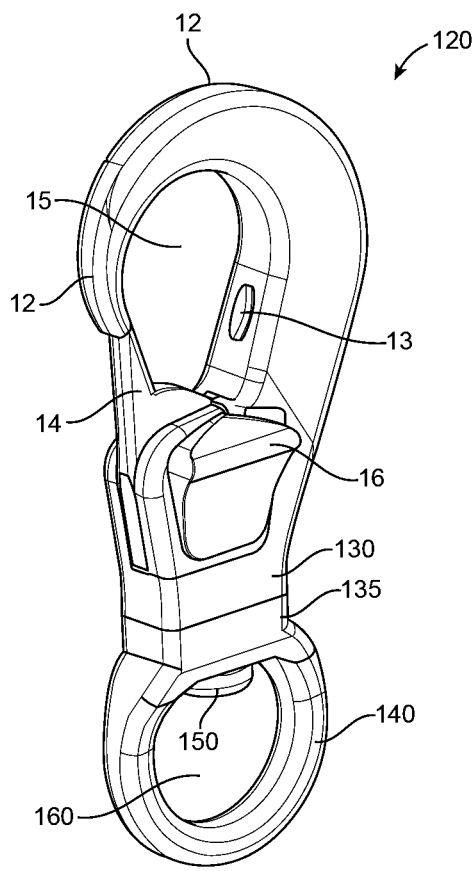
FIG. 12 shows a left perspective view of one embodiment of the invention including a swivel base in a first position with the lever in a closed position.

FIG. 12 shows a left perspective view of a snap-hook 120 including a swivel base portion 135 attached to a base portion 130 shown in an example position with the lever 14 shown in a closed position according to one embodiment of the invention. As shown, the base portion 130 of the snap-hook 120 is attached to the swivel base portion 135 of the snap-hook 120 via a swivel connector 150. A loop 140 attached to or formed with the swivel base portion 135 forms an inner loop 160.

In one example, the loop 140 of the snap-hook 120 may swivel or rotate 360 degrees in either a clockwise or counterclockwise direction. In one embodiment of the invention, the base 130 and the swivel base portion 135 may be abutted next to or against one another and have a same or similar shape, for example, a polygonal shape, a rectangular shape, oval shape, etc. In one example, the loop 140 may be used for coupling to other devices, for example, rope, chain, other snap-hooks, cord, wire, hanging devices, pulleys, etc.

In one example, the swivel connector 150 may be threaded from loop 140 through the swivel base portion 135 into the base portion 130, or vice-versa. In another example, the swivel connector 150 is swaged from loop 140 through the swivel base portion 135 into the base portion 130, or vice-versa. In yet another example, the swivel connector 150 is welded from loop 140 through the swivel base portion 135 into the base portion 130, or vice-versa. In another example, the swivel connector 150 is cross-pinned from loop 140 through the swivel base portion 135 into the base portion 130, or vice-versa. In other examples, other equivalent coupling means may be employed to attach the swivel connector 150 from loop 140 through the swivel base portion 135 into the base portion 130, or vice-versa.

Figure 13:
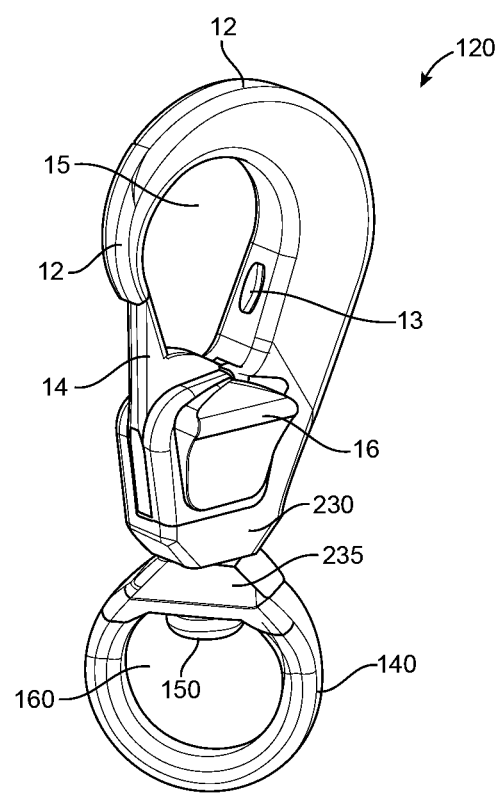
FIG. 13 shows a left perspective view of one embodiment of the invention including a swivel base in a second position with the lever in a closed position.

FIG. 13 shows a left perspective view of the snap-hook 120 including a swivel base portion 235 shown in an example rotated position with the lever 14 shown in a closed position according to one embodiment of the invention. In one embodiment of the invention, base 230 and the swivel base portion 235 may be abutted to one another and have a same or similar shape, for example, a polygonal shape, a rectangular shape, oval shape, etc. In one example, the base portion 230 and the swivel base portion 235 have opposing angled side portions.

Figure 14:
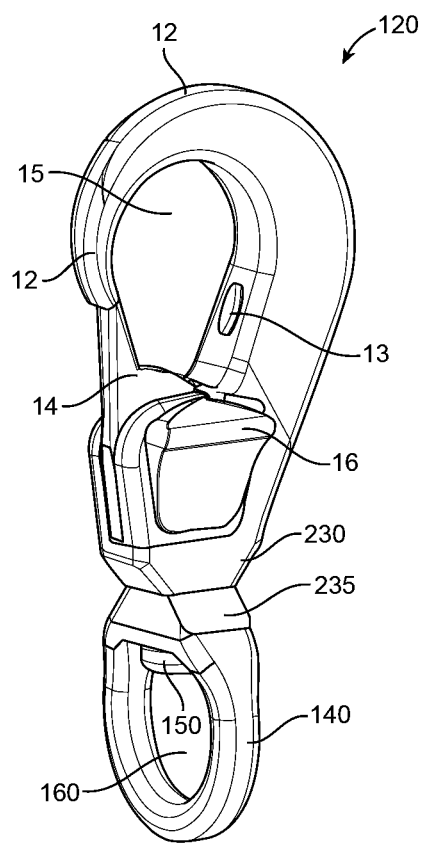
FIG. 14 shows a left perspective view of one embodiment of the invention including a swivel base in a third position with the lever in a closed position.

FIG. 14 shows a left perspective view of the snap-hook 120 with the swivel base portion 235 shown in another example rotated position with the lever 14 shown in a closed position according to one embodiment of the invention. In one example, the angled side portions of the base portion 230 and the swivel base portion 235 reduces overall weight of the snap-hook 120.

Figure 15:
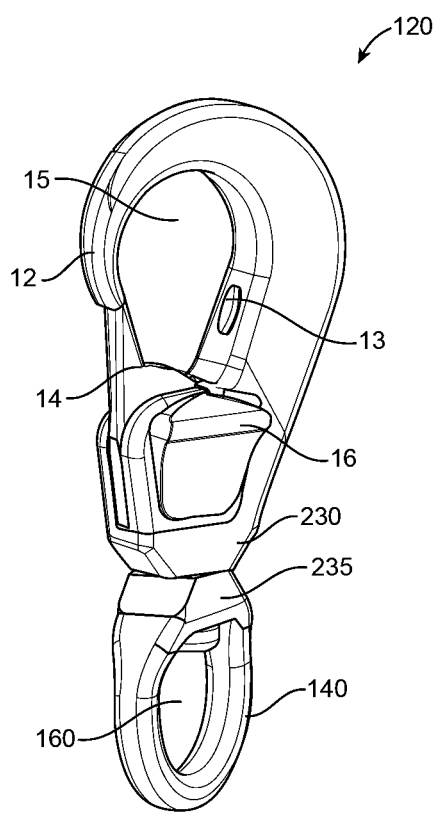
FIG. 15 shows a left perspective view of one embodiment of the invention including a swivel base in a fourth position with the lever in a closed position.

FIG. 15 shows a left perspective view of the snap-hook 120 with the swivel base portion 235 shown in another example rotated position with the lever 14 shown in a closed position according to one embodiment of the invention. In one example, the swivel connector 150 may be threaded from loop 140 through the swivel base portion 235 into the base portion 230, or vice-versa. In another example, the swivel connector 150 is swaged from loop 140 through the swivel base portion 235 into the base portion 230, or vice-versa. In yet another example, the swivel connector 150 is welded from loop 140 through the swivel base portion 235 into the base portion 230, or vice-versa. In another example, the swivel connector 150 is cross-pinned from loop 140 through the swivel base portion 235 into the base portion 230, or vice-versa. In other examples, other equivalent coupling means may be employed to attach the swivel connector 150 from loop 140 through the swivel base portion 235 into the base portion 230, or vice-versa.

In one example, the snap-hook 120 may have a thickness ranging between 0.25 inches to 0.5 inches, and the loop 140 may have a diameter ranging between 1.25 inches to 1.6 inches, preferably 1.553 inches. In one example, the loop 160 may have a diameter ranging between 1 inch to 1.25 inches, preferably 1.096 inches. In another example the height of the snap-hook 120 may range between 4 inches to 5 inches, preferably 4.726 inches. In one example, the radius of the hook 12 of the snap-hook 120 may range between 1 inch to 1.25 inches, preferably 1.089 inches. In one embodiment of the invention the distance between the front portion of the hook 12 to the back portion of the hook 12 may range between 1.9 inches to 2.25 inches, preferably 1.99 inches. In other embodiments of the invention, other variations of length, width, height, and thickness for the snap-hook 120 and its elements may have other ranges depending on the desired use of the snap-hook 10 and desired requirements.

Elements of the snap-hook 10 and snap-hook 120 may be made out of metal, metal-alloys, other equivalent materials, etc. In one example, the hook 12, the formed loop 50 and the loop 140 are made of 6061 T6 aluminum. In another example, the lever 14, biasing element 41, pin 31 and pin 32 are made of stainless steel, such as 304 stainless steel. In some embodiments of the invention, corrosive prohibiting materials or solutions may be applied to the different elements of the snap-hook 10 and the snap-hook 120. It should be noted that the elements of the snap-hook 10 and the snap-hook 120 may be made of other equivalent materials or stronger materials to provide the desired strength and for serving a desired environment use, such as mountaineering, climbing or fall protection environments, ocean, lake or other water type environments, indoor environments, desert or arctic environments, etc.

In one embodiment of the invention, the snap-hook 10 and the snap-hook 120 may have a weight-holding limit (e.g., a hook 12 fracture point) of 2350 pounds for a snap-hook 10 or a snap-hook 120 made of Aluminum. In another embodiment of the invention, the snap-hook 10 and the snap-hook 120 may have a weight-holding limit of 4700 pounds for a snap-hook 10 or a snap-hook 120 made of Titanium. In yet another embodiment of the invention, the snap-hook 10 and the snap-hook 120 may have a weight-holding limit of 7050 pounds for a snap-hook 10 or a snap-hook 120 made of 2-2-5 Stainless Steel.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A snap-hook, comprising:
   a hook, forming a portion of an eye loop;
   a lever that is pivotally movable relative to the hook, the lever forming a remaining portion of said eye loop with respect to the hook;
   a thumb tab that engages the lever, the thumb tab including a protruding portion on inner side of the thumb tab, the lever further including an opening for receiving said protruding portion of the thumb tab;
   the thumb tab further including a thumb tab extension positioned in an angled slot defined in a guide plate, the angled slot being transverse to a longitudinal axis of the snap-hook at a less than 90 degree angle;
   wherein said thumb tab extension is offset from the protruding portion, and shaped to be slidably received in said angled slot, such that the thumb tab extension is slidable in the angled slot relative to the guide plate, forming a release mechanism, whereby the sliding movement of the thumb tab extension in the angled slot urges the protruding portion of the thumb tab against said lever opening and causes the lever to pivot relative to the hook to open said eye loop, wherein the lever is independently rotatable to open said eye loop essentially without sliding the thumb tab down;

wherein the thumb tab is located on a broad face of the snap-hook for operating of the release mechanism with one hand.

2. The snap-hook of claim 1, further comprising a biasing member positioned between the lever and the hook, whereby the lever is biased against pivotable movement with respect to the hook, and is pivotable relative to the hook to open the eye loop when a force is applied against the lever and/or the thumb tab to overcome the biasing force of the biasing member.

3. The snap-hook of claim 2, wherein the lever has a proximal and a distal end, such that the proximal end of the lever is pivotally connected to the hook, and the distal end of the lever is biased against a slot formed in the hook by the biasing member to form the eye loop.

4. The snap-hook of claim 1, wherein the hook has a recessed portion to accommodate movement of a portion of the lever therein as the lever pivots.

5. The snap-hook of claim 1, wherein said thumb tab extension has an elongated portion disposed in the angled slot, such that the elongated portion is longitudinally offset from the protruding portion.

6. The snap-hook of claim 1, wherein:
said lever opening is sized such that the lever is independently rotatable to open said eye loop essentially without engaging the protruding portion of the thumb tab or sliding the thumb tab down in the angled slot of the guide plate.

7. The snap-hook of claim 6, wherein the angled slot is angled between 40 degrees and 80 degrees.

8. The snap-hook of claim 1, further comprising a fixed loop portion formed in a lower portion of the snap hook wherein the hook includes a body partially forming said portion of the eye loop.

9. The snap-hook of claim 1, further comprising a rotatable loop portion coupled to a base portion of the snap hook.

10. A snap-hook, comprising:
a hook section having an open segment forming a portion of an eye loop;
a lever that is pivotally movable relative to the open segment of the hook section;
a biasing means positioned between the hook section and the lever for biasing the lever against pivoting relative to the hook;
a guide plate; and
a thumb tab that engages the lever, the thumb tab including an extension having a protruding portion on an inner side of the thumb tab, the lever further including an opening for receiving said protruding portion of the thumb tab,
the thumb tab further including a thumb tab extension disposed in an angled slot defined in the guide plate, the angled slot being transverse to a longitudinal axis of the snap-hook at a less than 90 degree angle, said extension being offset from the protruding portion, and shaped to be slidably disposed in said angled slot, such that the extension is slidable in the angled slot relative to the guide plate;
the thumb tab and the lever forming a release mechanism, such that applying force to the thumb tab that overcomes said biasing, effects the extension to slide in the angled slot and urge the protruding portion of the thumb tab against said lever opening, wherein the lever pivots relative to the hook section to open said eye loop;
wherein a back face of the snap-hook can be placed into the palm of a user's hand to hold the snap-hook, wherein the thumb tab is located on a front broad face of the snap-hook providing one hand operation of the release mechanism.

11. The snap-hook of claim 10, wherein the lever further includes an opening for receiving a protruding portion of the thumb tab, such that the lever can rotate to open said eye loop, essentially without sliding the thumb tab down in the angled slot.

12. The snap-hook of claim 11, wherein the hook section has a recessed portion to accommodate movement of a portion of the lever therein as the lever pivots.

13. The snap-hook of claim 11, wherein the hook section includes a body partially forming said portion of the eye loop and a lower ring portion.

14. The snap-hook of claim 11, further comprising a rotatable loop portion coupled to a base portion of the snap hook.

15. The snap-hook of claim 11, wherein: the lever opening is larger than said protruding portion of the thumb tab, such that the lever is independently rotatable to open said eye loop essentially without engaging the protruding portion of the thumb tab or sliding the thumb tab down in the angled slot.

16. The snap-hook of claim 15, wherein said thumb tab extension has an elongated portion longitudinally offset from the protruding portion.

17. The snap-hook of claim 10, wherein the biasing means comprises a spring positioned between the lever and the hook section, wherein the lever is biased against pivotable movement with respect to the hook section.

18. The snap-hook of claim 17, wherein the lever is pivotable relative to the hook section to open the eye loop when a force is applied against the lever and/or the thumb tab to overcome the biasing force of the spring.

19. The snap-hook of claim 18, wherein the lever has a proximal end and a distal end such that the proximal end of the lever is pivotally connected to the hook section, and the distal end of the lever is biased against a slot formed in the hook by the biasing member to form the eye loop.

20. A snap-hook, comprising:
a hook, forming a portion of an eye loop; and
a lever that is movable relative to the hook and a thumb tab having an extension positioned in an angled slot defined in a guide plate, the lever forming a remaining portion of said eye loop with respect to the hook;
the lever further including an opening for receiving a protruding portion of the thumb tab, such that sliding the thumb tab on a broad face of the snap-hook causes the thumb tab extension to slide in the angled slot and urge the lever to move relative to the hook to open said eye loop, wherein the lever is moveable to open said eye loop independent from moving the thumb tab;
wherein the angled slot is transverse to a longitudinal axis of the snap-hook at a less than 90 degree angle, and the extension is offset from the protruding portion, and shaped to be slidably disposed in said angled slot.

21. The snap-hook of claim 20, wherein the snap-hook has essentially broad, opposing, front and back sides, and relatively narrower edges, such that the back side of the snap-hook can be placed into the palm of a user's hand to hold the snap-hook, wherein the thumb tab is located on the snap-hook such that moving the thumb tab at an acute angle relative to the snap-hook causes the lever to move relative to the hook to open said eye loop, to allow simpler holding of the snap-hook and operation of the release mechanism with one hand while essentially eliminating swiveling of the snap-hook in the hand.

22. The snap-hook of claim 20, further comprising a biasing member positioned between the lever and the hook, wherein the lever is biased against pivotable movement with respect to the hook, and is movable relative to the hook to open the eye loop when a force is applied against the lever and/or the thumb tab to overcome the biasing force of the biasing member.

23. The snap-hook of claim 22, wherein the lever has a proximal and a distal end, such that the proximal end of the lever is movably connected to the hook, and the distal end of the lever is biased against a slot formed in the hook by the biasing member to form the eye loop.

24. The snap-hook of claim 20, wherein the hook has a recessed portion to accommodate movement of a portion of the lever therein as the lever moves.

25. The snap-hook of claim 20, wherein: the lever opening is larger than said protruding portion of the thumb tab, such that the lever is independently rotatable to open said eye loop essentially without engaging the protruding portion of the thumb tab or moving the thumb tab.

26. The snap-hook of claim 20, further comprising a fixed loop portion formed in a lower portion of the snap hook, and a rotatable loop portion coupled to a base portion of the snap hook.

27. The snap-hook of claim 20, wherein said thumb tab extension has an elongated portion longitudinally offset from the protruding portion.

28. A snap-hook, comprising:
   a hook section having an open segment forming a portion of an eye loop;
   a lever that is pivotally movable relative to the open segment of the hook section to block and unblock the open segment, the lever forming a remaining portion of said eye loop with respect to the hook section;
   a biasing means positioned between the hook section and the lever for biasing the lever against pivoting relative to the hook section;
   a tab including a protruding portion that engages the lever, the tab further including an extension coupled on an inner side of the tab and disposed in an angled slot defined in a guide plate, such that the extension is slidable in the angled slot relative to the guide plate;
   the tab and the lever forming a release mechanism, such that applying force to the tab that overcomes said biasing, effects the extension to slide in the angled slot at an acute angle, wherein the protruding portion urges the lever to pivot relative to the hook section to open said eye loop;
   wherein the angled slot is transverse to a longitudinal axis of the snap-hook at a less than 90 degree angle, and the extension is offset from the protruding portion and is shaped to be slidably disposed in said angled slot.

29. The snap-hook of claim 28, wherein the lever further includes an opening for receiving and engaging a portion of the tab, such that the lever can rotate relative to the extension as the tab extension slides in the angled slot of the guide plate.

30. The snap-hook of claim 29, wherein the snap-hook has essentially broad, opposing, front and back sides, and relatively narrower edges, such that the back side of the snap-hook can be placed into the palm of a user's hand to hold the snap-hook, wherein the tab is located on the front side of the snap-hook to allow simpler holding of the snap-hook and operation of the release mechanism with one hand while essentially eliminating swiveling of the snap-hook in the hand.

31. The snap-hook of claim 28, further comprising a fixed loop portion formed in a lower portion of the snap hook.

32. The snap-hook of claim 28, wherein said thumb tab extension has an elongated portion longitudinally offset from the protruding portion.

* * * * *